July 3, 1962 A. MOHR 3,042,817
OSCILLATING ELECTRIC MOTOR WITH ARMATURE HAVING A LINEAR GAP
Filed June 12, 1959

United States Patent Office 3,042,817
Patented July 3, 1962

3,042,817
OSCILLATING ELECTRIC MOTOR WITH ARMATURE HAVING A LINEAR GAP
Adolf Mohr, Buhlertal, Baden, Germany, assignor to Avog Elektro- und Feinmechanik G.m.b.H., Buhlertal, Baden, Germany, a corporation of Germany
Filed June 12, 1959, Ser. No. 820,059
Claims priority, application Germany June 14, 1958
7 Claims. (Cl. 310—38)

My invention relates to alternating-current motors of the oscillating type for use in electric dry shavers, hair clippers, or other electric appliances.

In the known motors of this type, an electromagnet operating with alternating current of the customary line frequency, 50 or 60 c.p.s., acts upon a spring-biased armature to reciprocate it at twice the line frequency. Such motors, contrary to rotary motors of equivalent rotating speed, combine a simple design and a long time of useful life with the advantage of causing no radio interference so as to avoid the necessity of using interference-eliminating means as required for rotating motors. In other respects, however, the known oscillating motors possess the following shortcomings.

Oscillating motors require a driving arm which is connected with the oscillating armature of the magnetic system and which transmits the oscillatory motion to the device to be driven, for example, the cutter of a dry shaver. In a known motor of this type, the oscillating armature is mounted on the side of the magnetic field system that faces the member to be driven, the motion-transmitting arm, accordingly, being very short. With such a short arm, requiring a relatively large angular motion for a given reciprocating travel of the driven member, the efficiency of the drive and the degree of travelling uniformity are rather poor. It has been found that for a given amplitude of the drive and for a given load imposed upon the oscillating motor by the device being driven, the motion-transmitting arm must have a given length for obtaining a maximum of driving power. This length is so large that, in a motor design as mentioned above, the over-all size of the drive as a whole is disagreeably large.

It is therefore, an object of my invention to devise an oscillating motor of improved efficiency but reduced space requirements.

Another object of my invention is to improve oscillating motors so that the oscillation of the armature assembly and hence the reciprocating travel of the driven device are more accurately sinusoidal than in the known motors of this type.

Still another object of my invention is to improve such oscillating motors in such a manner that the quality and characteristics of its operation do not depend upon careful selection of the biasing spring which forms part of the oscillating armature assembly, thus facilitating the manufacture of the motor and reducing the amount of rejects heretofore encountered.

According to one of the features of my invention, I mount the oscillating armature of the motor on the side of the magnetic field structure that faces away from the load device to be driven, and I dispose the motion-transmitting arm of the armature assembly so that it extends from the armature side of the field system to the opposite side where the device to be driven is located. With such a design, the driving arm of the armature assembly can be given the desired great length, but only the end portion of the arm that exceeds the axial length of the motor will protrude out of the space occupied by the magnetic components of the motor proper. As a result, the over-all structure is made more compact despite the fact that the driving arm has optimum dimensions. This has been found particularly favorable in electric shavers because the size of the drive motor, including the driving arm, essentially determines the size of the shaver housing, and because shavers having a smaller housing can be more easily manipualted than larger shavers.

According to another feature of my invention, applicable in conjunction with or separate from the feature mentioned above, a sinusoidal oscillation of the armature assembly is received by designing the air-gap space or spaces of the motor so that the gap width varies in linear proportion to the deflection of the oscillating armature within the range of the oscillation amplitude. The deflecting force, excited by sinusoidal current, is thus rendered proportional to the square of the sine wave, and the oscillation of the armature assembly is sinusoidal and free of upper harmonics. According to a more specific feature of the invention, subsidiary to the one just mentioned, the air-gap space or spaces are bordered by areas of the oscillating armature and of the stator which extend at a right angle to the oscillating plane of the armature and define an acute angle between each other.

According to a further feature of my invention, applicable in conjunction with or separate from those mentioned above, the armature assembly of the motor is mounted on a torsion spring which provides the main returning force for the armature assembly, but an auxiliary helical spring is added to bear against one side of the armature, and the latter spring is made adjustable in order to permit adjusting the torsion constant of the elastic force acting upon the armature assembly.

The foregoing and more specific objects, advantages and features of my invention will be apparent from, and will be mentioned in, the following description of the embodiments of devices according to the invention illustrated by way of example on the accompanying drawings, in which—

Figure 1:
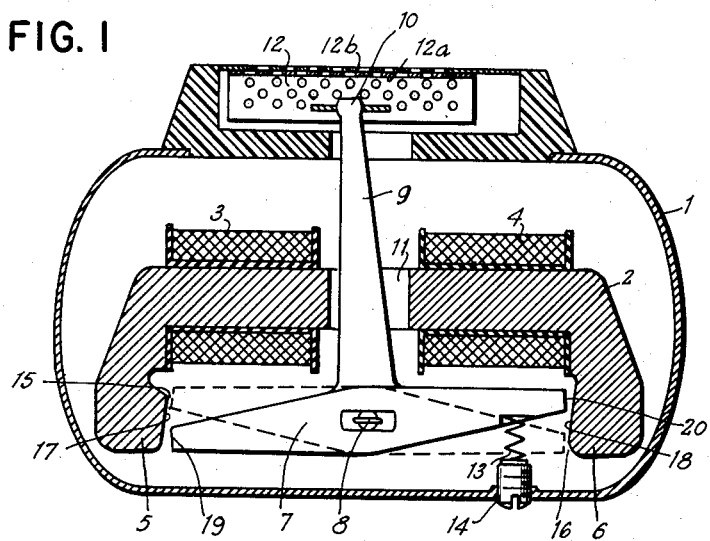
FIG. 1 is a sectional view of an electric dry shaver provided with an oscillating motor.

The dry shaver shown in FIG. 1 is provided with a housing 1 of sufficiently small size to be accommodated within the palm of one's hand. Mounted in the housing is a generally U-shaped iron body 2 which forms the stator or field system of the drive motor. Mounted on the stator body are two excitation coils 3 and 4 which, during operation of the motor, are traversed by sinusoidal electric current. The two legs 5 and 6 of the stator 2 form respective pole shoes between which an armature 7 is pivoted for oscillating motion. For this purpose, the armature 7 is mounted on a leaf spring 8 which acts as torsion spring and which protrudes on both sides, toward and away from the observer, out of the armature 7, the two ends of the spring being firmly clamped on a fixed part joined with the stator 2 or the housing 1. The driving arm 9 of the assembly is rigidly secured to the side of the oscillating armature 7 which faces the stator structure 2. The stator structure 2 has a centrally located opening 11 traversed by the arm 9 whose remote end 10 engages the reciprocating cutter of a shaver head 12 mounted upon housing 1. If desired, the driver arm 9 may pass laterally beyond the stator structure 2 by giving the arm 9 angular shape, in which case the opening 11 need not be provided.

When the coils 3 and 4 are energized by alternating current, the reciprocating armature assembly drives the perforated cutter plate 12a of the shaver head 12 back and forth so that the plate reciprocates along a thin, likewise perforated cover plate 12b in the conventional manner.

As apparent from FIG. 1, the driver arm 9 of the armature assembly is given particularly great length for the reasons explained above. Nevertheless, the over-all space requirements of the oscillating drive according to the invention is not greater than with the above-described known drive having a much shorter arm and having the armature assembly located on the stator side facing the shaver head. This advantage of the illustrated drive is due to the fact that the arm 9 has the major portion of its length extend within the space occupied by the stator and armature proper of the motor, so that only little additional space is required by the upwardly protruding end portion of arm 9.

As described above, the armature assembly is supported on the torsion spring 8 which may consist of spring steel. It has been necessary heretofore to individually test such torsion springs relative to their spring constant and to eliminate the springs that do not meet the particular requirements of the oscillating motor, it being another object of my invention to avoid the necessity for such individual testing as well as wasting the spring material found unsuitable. For this purpose, the device illustrated in FIG. 1 is provided with a compensating spring 13 consisting preferably and as shown of a helical spring which bears against one side of the armature assembly and is so mounted that it can readily be adjusted by means of a set screw 14. As a result, the required spring constant can be adjusted by tightening or relaxing the compensating spring 13, thus compensating for any irregularity in material or properties of the main torsion spring 8.

The same adjusting device can also be used for adapting the stiffness of the oscillating armature drive to any particular requirements. As shown, the compensating spring can readily be mounted at such a location that, in the event the stiffness of the oscillating assembly changes during use of the device, a readjustment by hand can be made. In order to permit controlling the amplitude of the oscillating armature together with the adjustment in stiffness, it is preferable to give the oscillating armature such a field profile that the magnetic pulling force is substantially independent of the armature position, this being also realized in the embodiment shown in FIG. 1.

The possibility afforded by the invention of compensating for any differences in torsion constant is particularly important for mass production of appliances such as electric dry shavers, because by virtue of the invention the torsion springs need no longer be tested and sorted individually. They can be issued to the manufacturing operations without any individual checking, since any differences in spring constant can subsequently be taken into account by correspondingly turning the set screw 14.

As mentioned above, it is desirable to operate the oscillating armature assembly in such a manner as to approach as much as possible a correct sinusoidal oscillation. This is done in the illustrated embodiment in the following manner. The two air gaps 15 and 16 between the stator 2 and the armature 7 are bordered on the one hand by two mutually parallel end faces 17 and 18, at the pole portions of the stator, and by two mutually parallel end faces 19 and 20 of the armature 7. These two pairs of pole faces extend at a right angle to the plane of oscillation, here constituted by the plane of illustration. The two pole faces that are located opposite each other at each of the two air gaps define together an acute angle. The air-gap space defined by the interspace between the pole faces of each pair, to the extent the gap is traversed by magnetic flux, varies in linear proportion to the deflection of the oscillating armature from its position of rest. The length of the surface areas 17 and 18 in the plane of illustration is such that the air-gap variation remains linear over the entire oscillating travel range of the armature 7. That is, when the armature is in either one of its extreme angular positions, the end faces 19 and 20 of the armature are still located opposite the above-described faces 17 and 18 respectively of the stator structure.

In the illustrated embodiment of FIG. 1, the return force, imposed by the springs upon the armature, is so dimensioned relative to the magnetic excitation that the armature occupies one of its extreme end positions when located as shown in full lines, and occupies the broken-line position when in the other extreme limit location.

Figure 2:
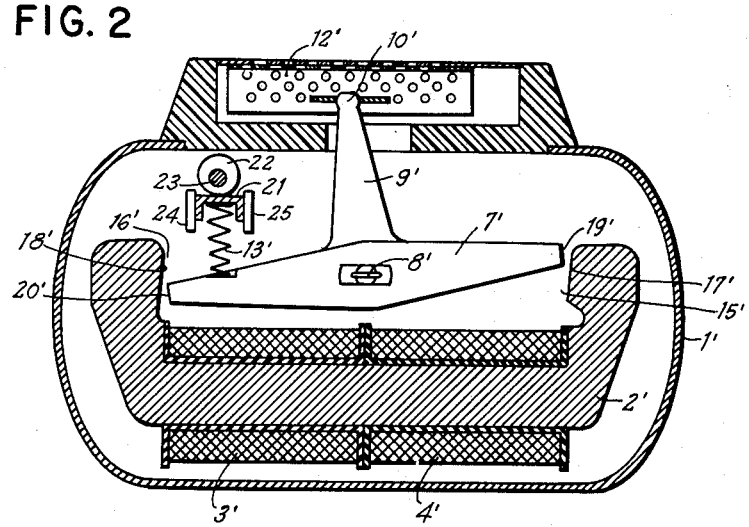
FIG. 2 shows schematically and in section another oscillating drive motor, also applied to a dry shaver.

The oscillating motor shown in FIG. 2 embodies some of the above-described features of my invention in a dry shaver which differs from that of FIG. 1 essentially in that the armature 7' is mounted on the stator side facing the cutter head to be driven. The components of the device shown in FIG. 2, inasmuch as they are similar to those described above with reference to FIG. 1, are denoted by the same reference characters as in FIG. 1 except that a prime is added. It will be noted that the design and performance of the air-gap features, including the pole faces 17', 18', 19', 20', are as described above with reference to FIG. 1.

The device of FIG. 2 is further provided with a compensating spring 13' which abuts against a stop member 21. The member 21 can be moved toward and away from the armature 7' by means of an eccentric 22 mounted on a shaft 23 which can be rotated from the outside of the housing, for example, by means of a screw driver. The stop 21 is guided for parallel motion between guide members 24, 25 rigidly attached to the housing structure.

It will be obvious to those skilled in the art, upon a study of this disclosure, that my invention permits of various modifications in design and may be applied not only to dry shavers but also to other appliances with oscillating drive motors, without departing from the essential features of my invention and within the scope of the claims annexed hereto.

I claim:
1. An oscillating electric motor, comprising a stator having a magnetizable field structure and electric excitation coils mounted on said structure, said structure having a pair of mutually opposed pole faces defining a pole space located on one side of said structure, fixed pivot means and an armature pivotally mounted thereon for forward and reverse pivotal movement thereabout and within said pole space said pole faces and said armature together defining at least one air gap lying within said pole space, said pivot means including, spring means joined with said armature and forming an oscillatory system together therewith, and a driver arm rigidly joined with said armature and extending from said one side to the other side of said structure, said arm having a driving end protruding from said other side.

2. An oscillating electric motor, comprising a stator having a substantially U-shaped field structure and electric excitation coil means mounted on the bight portion of said structure, said structure having two legs provided with respective planar pole faces located opposite each other in mutually spaced relation on one side of said bight portion, means forming a fixed pivot center between said pole faces, an armature pivotally mounted for oscillatory movement about said center between said pole faces, said pole faces and said armature together defining at least one air gap lying within said pole space, said pivot means including spring means joined with said armature and forming an oscillatory system together therewith, and a driver arm rigidly joined with said armature on the armature side facing said bight portion of said structure, said arm extending from said armature to the other side of said bight portion.

3. An oscillating electric motor, comprising a stator having a substantially U-shaped field structure and electric excitation coil means mounted on the bight portion of said structure, said structure having an opening centrally traversing said bight portion and having two legs provided with respective mutually parallel planar pole faces located opposite each other in mutually spaced relation, an armature pivotally mounted between said pole faces, spring means joined with said armature and forming an oscillatory system together therewith, and a driver arm rigidly joined with said armature on the armature side facing said bight portion of said structure, said arm extending from said armature and through said opening to the other side of said bight portion.

4. An oscillating electric motor, comprising a stator having a magnetizable field structure and electric excitation coils mounted on said structure, said structure having two planar mutually opposed pole faces defining a pole space located on one side of structure, an armature pivotally mounted for oscillatory pivotal movement within said pole space on said one side of said structure, a straight torsion spring on which said armature is mounted, said spring extending on the pivot axis of said armature, and a driver arm rigidly joined with said armature and extending from said one side to the other side of said structure, said arm having a driving end protruding from said other side.

5. In an oscillating electric motor according to claim 1, said pole faces being planar and mutually parallel, and the portion of said armature defining said air gap also being planar, said air gap having a variable width linearly proportional to the oscillating deflection of said armature.

6. In an oscillating electric motor according to claim 2, said armature having two planar end faces which together with said planar pole faces of said structure form two air gaps, all of said four faces extending at a right angle to the oscillation plane of said armature, and each two adjacent ones of said faces defining together an acute angle, whereby said air gaps have a variable width linearly proportional to the oscillating deflection of said armature.

7. An electric oscillating motor according to claim 4, comprising an auxiliary helical spring in biasing engagement with said armature, and a manually adjustable stop forming an abutment for said auxiliary spring to permit adjusting the torsion-spring constant of said oscillatory system.

References Cited in the file of this patent

UNITED STATES PATENTS

| | | |
|---|---|---|
| 2,301,147 | Schaat et al. | Nov. 3, 1942 |
| 2,759,114 | Rolli et al. | Aug. 14, 1956 |
| 2,878,404 | Carmichael | Mar. 17, 1959 |
| 2,958,793 | Lonnqvist | Nov. 1, 1960 |

FOREIGN PATENTS

| | | |
|---|---|---|
| 233,632 | Switzerland | Nov. 1, 1944 |